(12) United States Patent  
Schutt

(10) Patent No.: US 11,207,934 B2  
(45) Date of Patent: Dec. 28, 2021

(54) VEHICLE SUSPENSION ASSEMBLY

(71) Applicant: SAF-HOLLAND, Inc., Muskegon, MI (US)

(72) Inventor: Randy L. Schutt, Holland, MI (US)

(73) Assignee: SAF-HOLLAND, Inc., Muskegon, MI (US)

( * ) Notice: Subject to any disclaimer, the term of this patent is extended or adjusted under 35 U.S.C. 154(b) by 116 days.

(21) Appl. No.: 16/684,647

(22) Filed: Nov. 15, 2019

(65) Prior Publication Data

US 2020/0156427 A1 May 21, 2020

Related U.S. Application Data

(60) Provisional application No. 62/768,567, filed on Nov. 16, 2018.

(51) Int. Cl.
| | |
|---|---|
| *B60G 9/02* | (2006.01) |
| *B60G 9/00* | (2006.01) |
| *B60G 7/00* | (2006.01) |

(52) U.S. Cl.  
CPC .............. *B60G 9/02* (2013.01); *B60G 7/008* (2013.01); *B60G 9/003* (2013.01);  
(Continued)

(58) Field of Classification Search  
CPC ........ B60G 2200/315; B60G 2200/324; B60G 2206/121; B60G 2206/122;  
(Continued)

(56) References Cited

U.S. PATENT DOCUMENTS 4,415,179 A * 11/1983 Marinelli ............... B60G 9/003  
                                                                 280/124.116  
5,366,035 A * 11/1994 Hayashida ............... B60G 9/02  
                                                                 180/24.01

(Continued)

FOREIGN PATENT DOCUMENTS

DE         3937674 A1 * 5/1990 ......... B60G 17/0162  
DE    102006045864 A1 * 4/2008 ............. B60G 9/027  
(Continued)

OTHER PUBLICATIONS

Machine language translation of DE102008062901A1, obtained from espacenet.com on May 6, 2021 (Year: 2010).*

(Continued)

*Primary Examiner* — James A English  
*Assistant Examiner* — Mary E Young  
(74) *Attorney, Agent, or Firm* — Price Heneveld LLP

(57) ABSTRACT

A vehicle suspension assembly includes an axle member, a pair of mounting brackets configured to couple to a vehicle frame, and a trailing arm arrangement that includes a first trailing arm portion having a first end pivotably coupled to one of the pair of mounting brackets, and a second end rotationally coupled with the axle member at a first position, a second trailing arm portion having a second end pivotably coupled to the other of the pair of mounting brackets, and a second end rotationally coupled with the axle member at a second position, and a first torsional member having a first end fixedly coupled to the first trailing arm portion and a second end fixedly secured to the axle member at a third position, the first torsional member configured to transmit torsion of the axle member to the first trailing arm portion.

30 Claims, 6 Drawing Sheets

(52) U.S. Cl.
CPC .... *B60G 2200/31* (2013.01); *B60G 2200/314* (2013.01); *B60G 2200/326* (2013.01); *B60G 2202/152* (2013.01); *B60G 2204/148* (2013.01); *B60G 2206/12* (2013.01); *B60G 2206/8201* (2013.01); *B60G 2206/821* (2013.01)

(58) Field of Classification Search
CPC ........ B60G 2206/123; B60G 2206/124; B60G 17/025; B60G 2200/21; B60G 2200/23; B60G 2202/13; B60G 2202/134; B60G 2204/124; B60G 2204/4307
See application file for complete search history.

(56) References Cited

U.S. PATENT DOCUMENTS

| | | | | |
|---|---|---|---|---|
| 2003/0214118 A1* | 11/2003 | Pavuk | ...................... | B60G 5/00 |
| | | | | 280/678 |
| 2004/0256829 A1* | 12/2004 | Chalin | ................. | B60G 21/051 |
| | | | | 280/124.116 |
| 2007/0138755 A1* | 6/2007 | Copsey | ................... | B60G 11/15 |
| | | | | 280/124.116 |
| 2010/0025953 A1* | 2/2010 | Buhl | ...................... | B60G 7/005 |
| | | | | 280/124.111 |
| 2019/0118607 A1* | 4/2019 | Schutt | ................... | B60G 11/27 |

FOREIGN PATENT DOCUMENTS

| | | | | | |
|---|---|---|---|---|---|
| DE | 102008010614 A1 * | 9/2009 | ............... | B60G 3/22 |
| DE | 102008062901 A1 * | 6/2010 | ........... | B60G 21/051 |
| DE | 102014215876 A1 * | 2/2016 | ........... | B60B 35/004 |
| DE | 102015209351 A1 * | 11/2016 | ............ | B60G 9/003 |
| EP | 1110848 A2 * | 6/2001 | ............ | B62D 21/11 |

OTHER PUBLICATIONS

Machine language translation of DE102014215876A1, obtained from espacenet.com on May 4, 2021 (Year: 2016).*

Machine language translation of DE102015209351A1, obtained from espacenet.com on May 6, 2021 (Year: 2016).*

* cited by examiner

VEHICLE SUSPENSION ASSEMBLY

CROSS REFERENCE TO RELATED APPLICATIONS

This application claims the benefit of U.S. Provisional Patent Application No. 62/768,567, filed on Nov. 16, 2018, entitled "VEHICLE SUSPENSION ASSEMBLY," the entire disclosure of which is incorporated herein by reference.

BACKGROUND

The embodiments as disclosed herein relate to a vehicle suspension assembly, and in particular to a vehicle suspension assembly for heavy-duty vehicles such as semi-trucks and semi-trailers, including a W-shaped torsional member configured to communicate forces exerted on an axle member of the suspension assembly with trailing arms or trailing arm portions of the suspension assembly.

BRIEF SUMMARY OF THE INVENTION

One embodiment may include a vehicle suspension assembly that may include an axle member, a pair of mounting brackets configured to couple to a vehicle frame, and a trailing arm arrangement. The trailing arm assembly may include a first trailing arm portion having a first end pivotably coupled to one of the pair of mounting brackets, and a second end rotationally coupled with the axle member at a first position, a second trailing arm portion having a second end pivotably coupled to the other of the pair of mounting brackets, and a second end rotationally coupled with the axle member at a second position, and a first torsional member having a first end fixedly coupled to the first trailing arm portion and a second end fixedly secured to the axle member at a third position, the first torsional member configured to transmit torsion of the axle member to the first trailing arm portion.

Another embodiment may include a vehicle suspension assembly that may include an axle member, a pair of mounting brackets configured to couple to a vehicle frame, and a trailing arm arrangement. The trailing arm arrangement may include a first trailing arm portion having a first end pivotably coupled to one of the pair of mounting brackets, and a second end rotationally coupled with the axle member at a first position, a second trailing arm portion having a second end pivotably coupled to the other of the pair of mounting brackets, and a second end rotationally coupled with the axle member at a second position, a first torsional member having a first end fixedly coupled to the first trailing arm portion and a second end fixedly secured to the axle member at a third position located between the first and second positions along a length of the axle, the first torsional member configured to transmit torsion of the axle member to the first trailing arm portion, and a second torsional member having a first end fixedly coupled to the second trailing arm portion and a second end fixedly secured to the axle member at a fourth position that is located between the first and second positions along the length of the axle member, the second torsional member configured to transmit torsion of the axle member to the second trailing arm portion, wherein the first and second trailing arm portions and the first and second torsional members cooperate to form a W-shape.

Yet another embodiment may include a vehicle suspension assembly that may include a trailing arm arrangement including a first trailing arm portion having a first end configured to pivotably coupled to one of a pair of vehicle frame mounting brackets, and a second end configured to rotationally couple with the axle member at a first position, a second trailing arm portion having a second end configured to pivotably coupled to the other of the pair of vehicle frame mounting brackets, and a second end configured to rotationally couple with the axle member at a second position, a first torsional member having a first end fixedly coupled to the first trailing arm portion and a second end configured to be fixedly secured to the axle member at a third position located between the first and second positions along a length of the axle, the first torsional member configured to transmit torsion of the axle member to the first trailing arm portion, and a second torsional member having a first end fixedly coupled to the second trailing arm portion and a second end configured to be fixedly secured to the axle member at a fourth position that is located between the first and second positions along the length of the axle member, the second torsional member configured to transmit torsion of the axle member to the second trailing arm portion, wherein the first and second trailing arm portions and the first and second torsional members cooperate to form a W-shape.

The principal objects of the embodiments as disclosed herein are to provide a durable vehicle suspension assembly that reduces manufacturing costs and overall weight of the suspension assembly, is capable of a long operating life, and is particularly well adapted for the proposed use.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
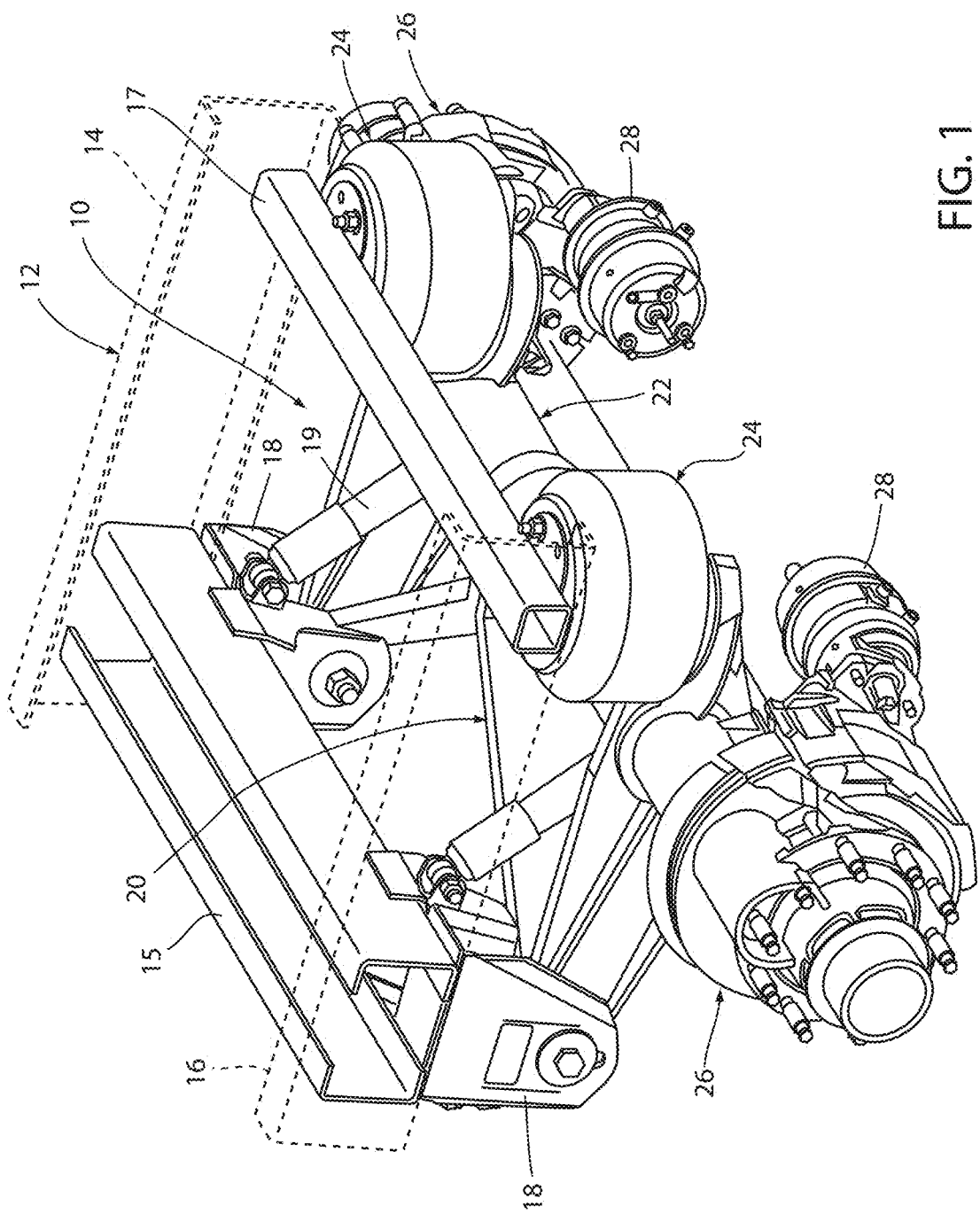
FIG. 1 is a top perspective view of a vehicle suspension assembly.
Figure 2:
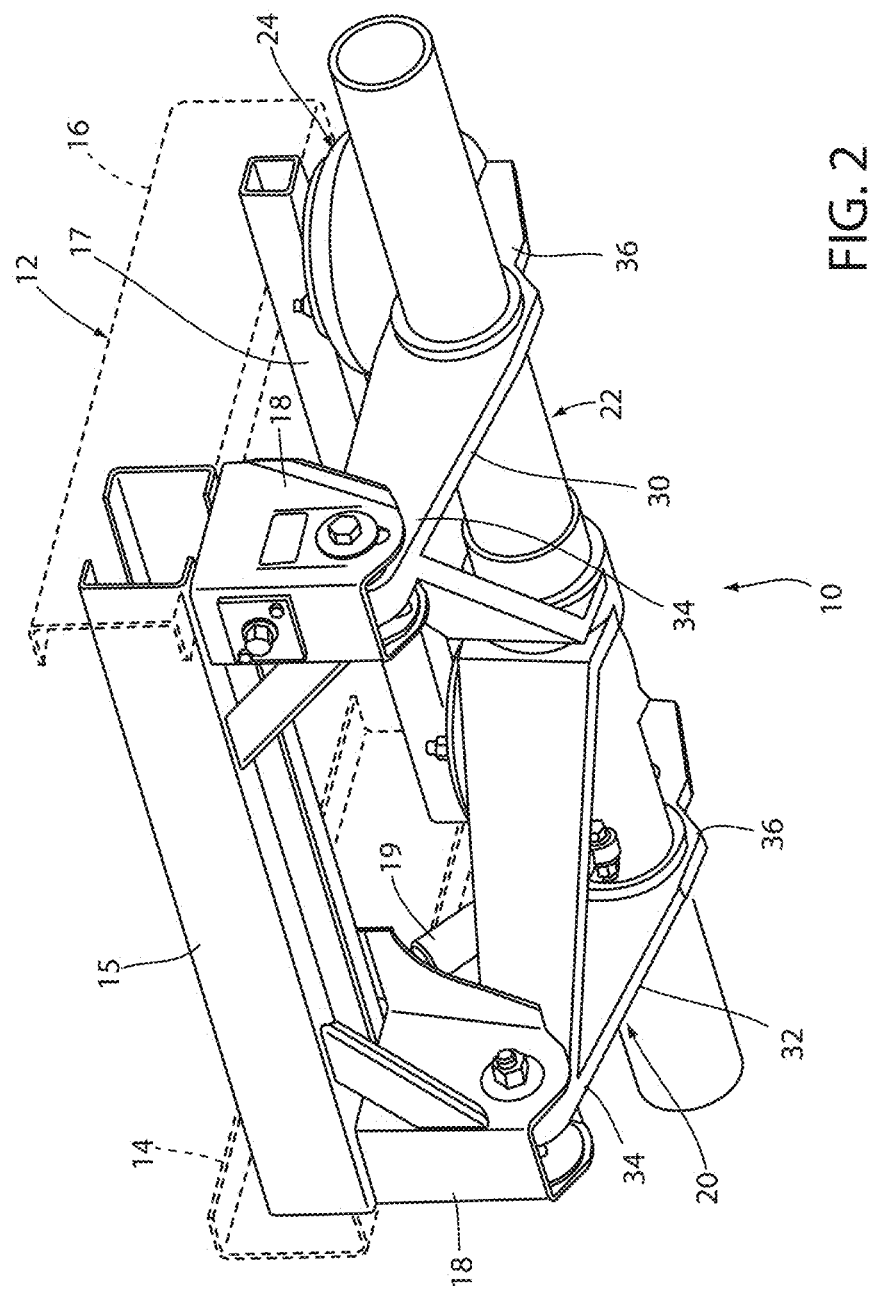
FIG. 2 is a bottom perspective view of the vehicle suspension assembly with rotor assemblies and brake assemblies removed.
Figure 3:
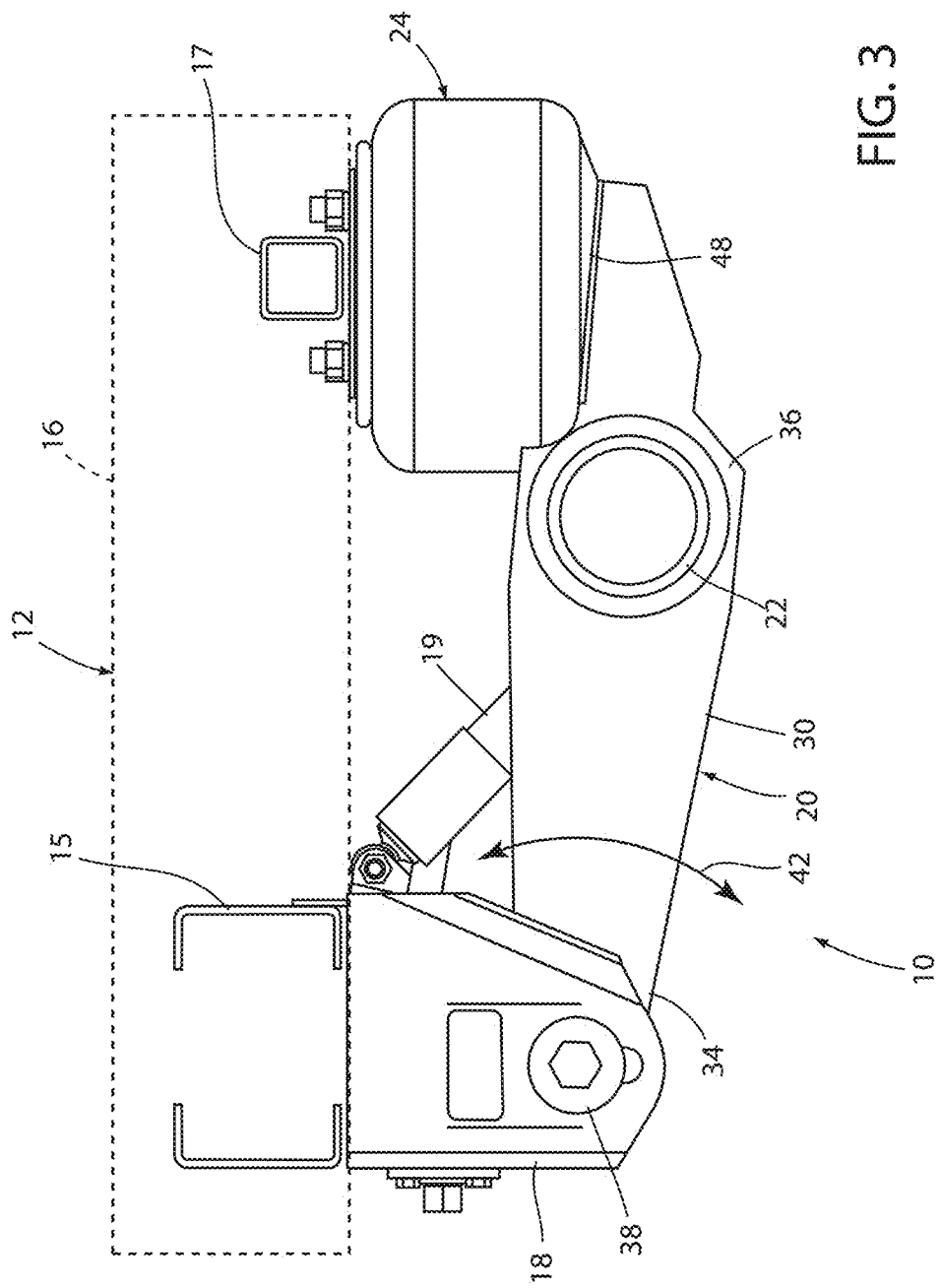
FIG. 3 is a side elevational view of the vehicle suspension assembly shown in FIG. 2.
Figure 4:
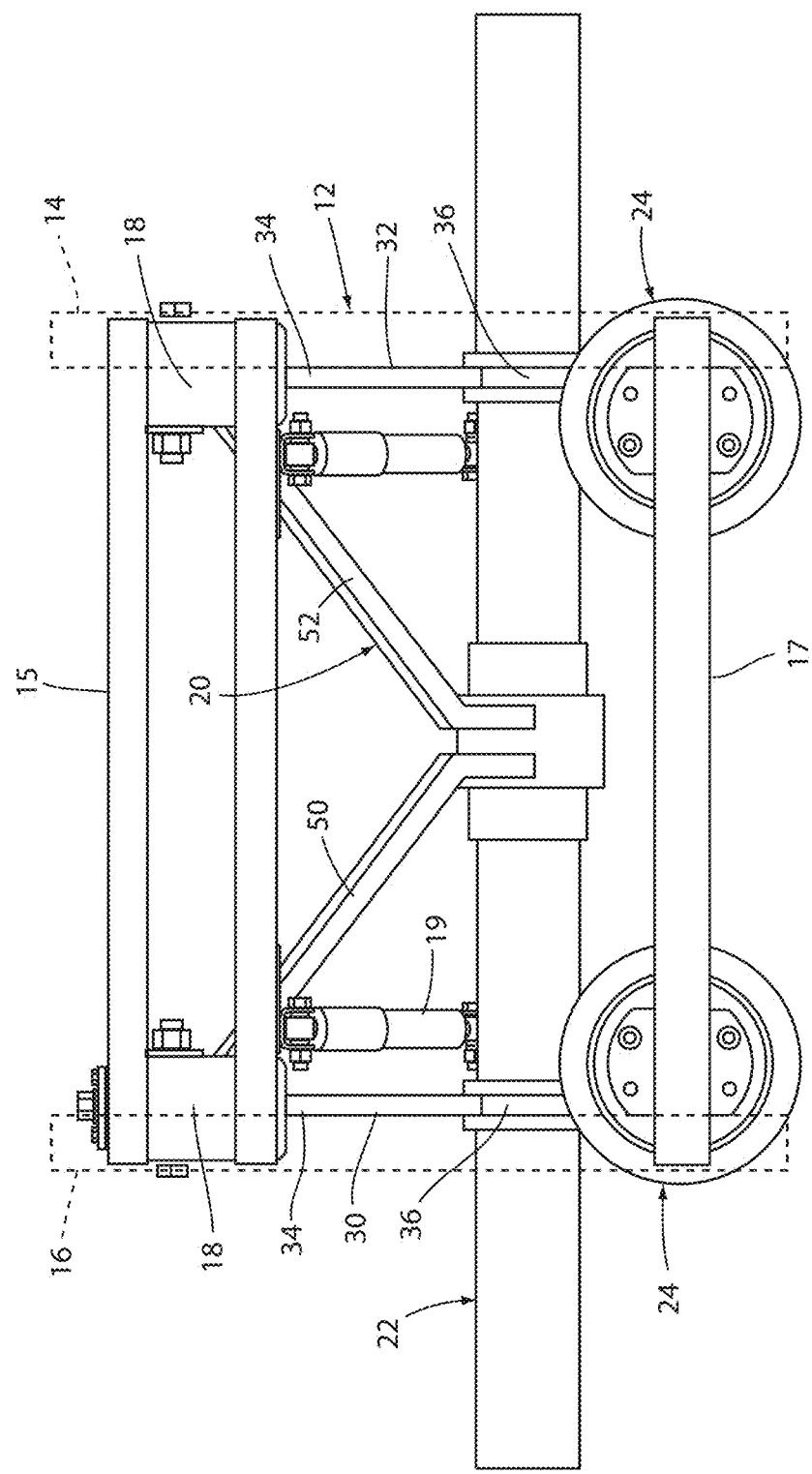
FIG. 4 is a top plan view of the vehicle suspension assembly.
Figure 5:
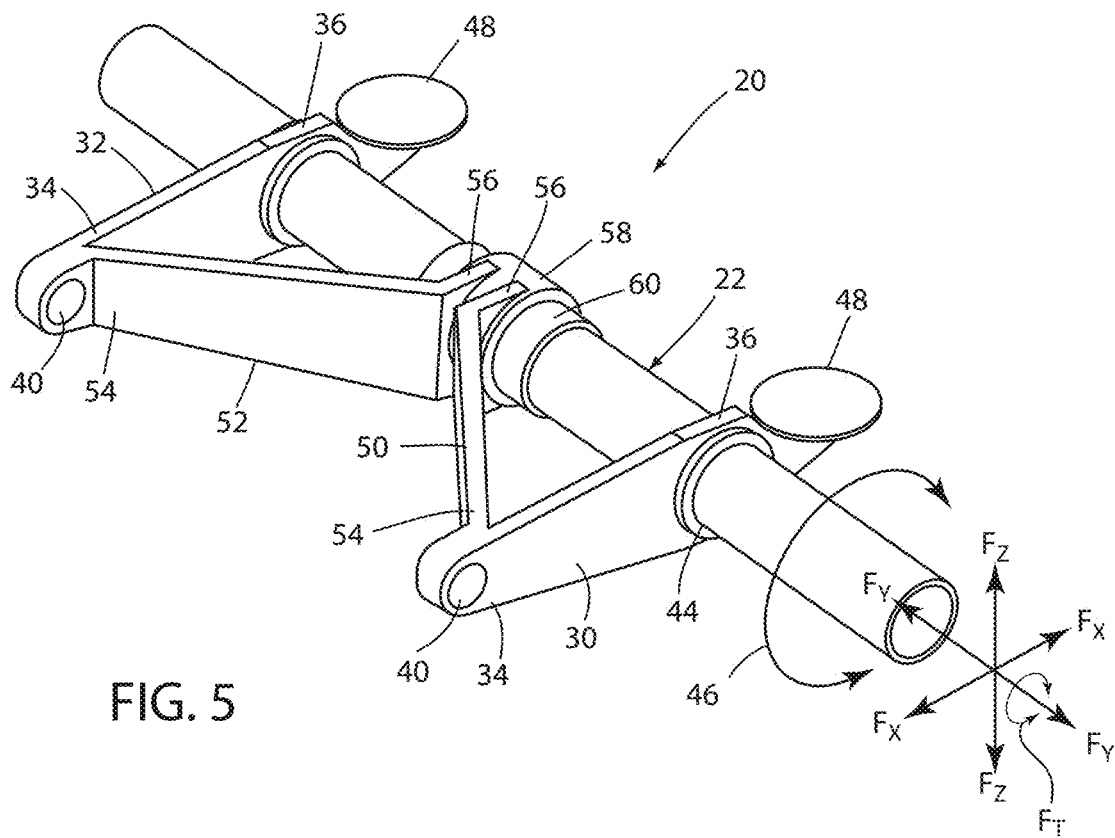
FIG. 5 is a perspective view of a W-shaped trailing arm arrangement coupled to an axle member.
Figure 6:
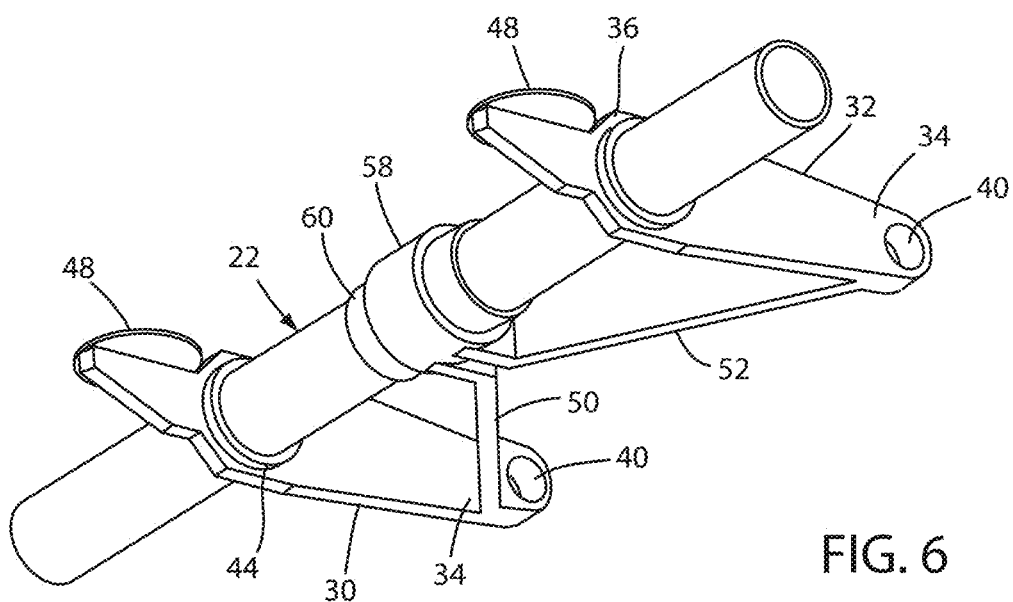
FIG. 6 is a bottom perspective view of the trailing arm arrangement coupled with the axle member.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

The reference numeral 10 (FIGS. 1-4) generally designates a vehicle suspension assembly supporting a vehicle frame assembly 12 and including a pair of longitudinally extending frame members 14, 16, where the vehicle frame assembly 12 supports a heavy-duty commercial-type vehicle, such as a semi-tractor or semi-trailer. In the illustrated example, the suspension assembly 10 includes a pair of mounting brackets 18 fixedly secured to an associated frame member 14, 16 and extending downwardly therefrom. The frame members 14, 16 are separated by a pair of cross-frame members 15, 17. The suspension assembly 10 further includes a trailing arm arrangement 20, an axle member 22, and a pair of air springs 24. In the illustrated example, the suspension assembly 10 may also include hub assemblies 26 rotationally supported on ends of the axle member 22, brake actuators 28, and dampers 19 extending between the mounting brackets 18 and the axle member 22.

The trailing arm arrangement 20 (FIGS. 1-6) may include a pair of longitudinally extending trailing arm portions 30, 32 each having a proximate or first end 34 and a distal or second end 36. As illustrated, the first end 34 of each of the trailing arm portions 30, 32 includes a bushing assembly 38 received within a bore 40 of the first end 34 of each of the trailing arm portions 30, 32 thereby pivotably coupling the first end 34 of each of the trailing arm portions 30, 32 with the associated mounting brackets 18, and such that the trailing arm arrangement 20 and axle member 22 may pivot in the directions 42.

The second end 36 (FIGS. 5 and 6) of each of the trailing arm portions 30, 32 are connected to the axle number 22 via a corresponding bushing assembly 44 at first and second positions along the length of the axle member 22, respectively. This connection arrangement between the trailing arm portions 30, 32 and axle member 22 allows the axle member 22 to pivot relative to the trailing arm portions 30, 32 in the directions 46, while simultaneously coupling the trailing arm portions 30, 32 to the axle member 22 such that longitudinal forces $F_X$, lateral forces $F_Y$ and vertical forces $F_Z$ exerted on the axle member 22 are transferred to the trailing arm portions 30, 32. It is noted that longitudinal forces $F_X$ are typically generated along the length of the corresponding vehicle during acceleration and deceleration of the vehicle, such as braking, that lateral forces $F_Y$ are typically generated on the axle member 22 when turning the vehicle and due to vehicle roll, while vertical forces $F_Z$ typically exerted on the axle member 22 due to vehicle roll as well as support of the vehicle along uneven road surfaces.

The second end 36 of each of the trailing arm portions 30, 32 may also include an air spring platform 48 configured to support an associated air spring 24 between the trailing arm portions 30, 32 and the vehicle frame members 14, 16.

The trailing arm arrangement 20 may also include a pair of torsional members 50, 52 extending between the trailing arm portions 30, 32 and the axle member 22. In the illustrated example, each torsional member 50, 52 includes a first end 54 fixedly secured to one of the trailing arm portions 30, 32 proximate the first end 34 of the trailing arm portion 30, 32 and a second end 56 fixedly secured to the axle member 22 at third and fourth positions, respectively, as described below. In the illustrated example, the second end 56 of each of the torsional members 50, 52 may be welded to the corresponding trailing arm portion 30, 32, or may be cast as a single, integral and homogeneous piece therewith. The second end 56 of each of the torsional members 50, 52 are welded or integrally formed with an outer collar 58 and an inner collar 60, where the axle member 22 is received within the inner collar 60 and the inner collar 60 is received within the outer collar 58. In the illustrated example, the inner collar 60 is configured to be welded to the axle member 22, while the outer collar 58 provides increased structural rigidity to the connection between the torsional members 50, 52 and the axle member 22. In the present example, the third and fourth positions at which the torsional members 50, 52 are respectively coupled to the axle member 22 are co-located along the length of the axle member 22 between the first and second positions at which the trailing arm portions 30, 32 are respectively coupled to the axle member 22. However, the positions of the connections of the trailing arm portions 30, 32 and the torsional members 50, 52 with the axle member 22 may be located along the length of the axle member 22 pursuant to particular requirements of the overall suspension assembly 10. Further, the elements of the trailing arm arrangement 20, such as the trailing arm portions 30, 32, the torsional members 50, 52 and the collars 58, 60 are preferably cast as a single, integral, homogeneous piece, but may also comprise multiple, individual components that are fixedly secured to one another via welding and/or mechanical fasteners. In the example as discussed above, the axle member 22 comprises a metal such that a weld may be formed between the inner collar 60 and the axle member 22. However, alternative embodiments may include an axle member 22 that comprises a composite material where the inner collar 60 is secured to the axle member 22 via an adhesive.

Figure 7:
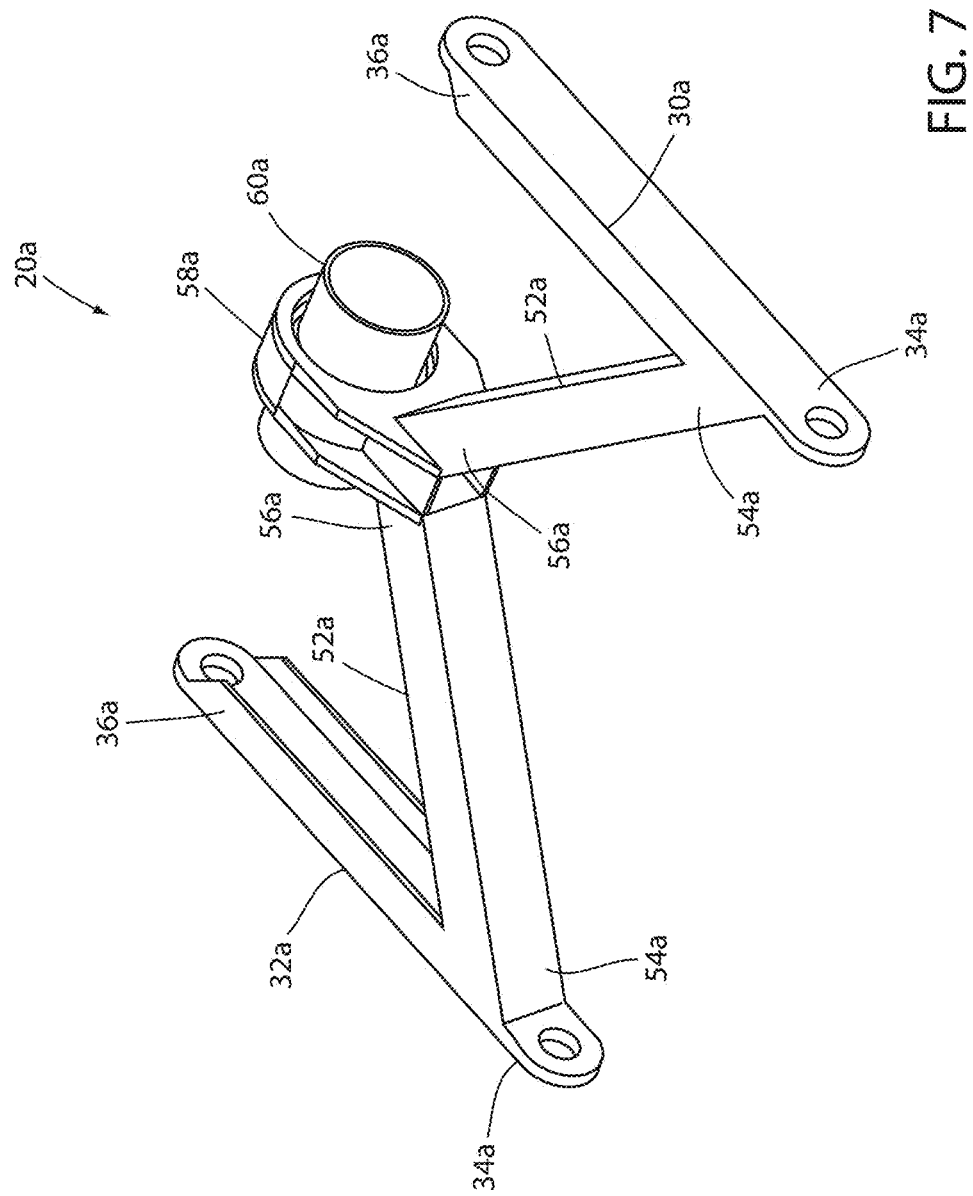
FIG. 7 is a perspective view of any alternative embodiment of the trailing arm arrangement.

The fixed securement of the collars 50, 68 and second end 56 of each of the torsional members 50, 52 to the axle member 22 allows torsion of the axle member 22 as a result of torquing forces $F_T$ being exerted on the axle member 22, such as the force is exerted during braking of the vehicle, to be transferred from the axle member 22 into the torsional members 50, 52 and into the first end 34 of the trailing arm portions 30, 32 and the mounting brackets 18. Transferring the torsion of the axle member 22 in this manner allows the trailing arm arrangement 20 to assist the axle member 22 in supporting torsion of the axle member 22, thereby allowing the use of an axle member 22 having a reduced thickness and weight relative to previously known suspension arrangements. Other configurations of the torsional members 50, 52 and the trailing arm portions 30, 32 may also be utilized so as to more adequately support the force as exerted thereon. For example, as best illustrated in FIG. 7, each of the trailing arm portions 30a, 32a may be provided with a C-shaped cross-sectional configuration, while the torsional members 50, 52 may be provided U-shaped or box-shaped cross-sectional configurations. It is noted that the reference numeral 20a generally designates this alternative embodiment of the trailing arm arrangement, and that since the trailing arm arrangement 20a is similar to the previously described trailing arm arrangement 20, similar parts appearing in FIGS. 5 and 6 and FIG. 7 respectively represent the same, corresponding reference numeral, except for the suffix "a" in the numerals of the latter.

The vehicle suspension assembly as shown and described herein provides a durable arrangement that reduces manufacturing costs and overall weight of the suspension assembly, is capable of a long operating life, and is particularly well adapted for the proposed use.

In the foregoing description, it will be readily appreciated by those skilled in the art that modifications may be made to the embodiments as disclosed herein without departing from the concepts as disclosed herein. Such modifications are to be considered as included in the following claims, unless these claims by the language expressly state otherwise.

The invention claimed is:

1. A vehicle suspension assembly, comprising:
   an axle member;
   a pair of mounting brackets configured to couple to a vehicle frame; and
   a trailing arm arrangement, comprising:
      a first trailing arm portion having a first end pivotably coupled to one of the pair of mounting brackets, and a second end rotationally coupled with the axle member at a first position thereby allowing the axle member to rotate with respect to the first trailing arm portion about a longitudinal axis of the axle member;
      a second trailing arm portion having a first end pivotably coupled to the other of the pair of mounting brackets, and a second end rotationally coupled with the axle member at a second position thereby allowing the axle member to rotate with respect to the second trailing arm portion about the longitudinal axis of the axle member; and
      a first torsional member having a first end fixedly coupled to the first trailing arm portion and a second end fixedly secured to the axle member at a third position, the first torsional member configured to transmit torsion of the axle member to the first trailing arm portion.

2. The vehicle suspension assembly of claim 1, wherein the third position is located between the first position and the second position along a length of the axle member.

3. The vehicle suspension assembly of claim 1, wherein the second end of the first trailing arm portion and the second end of the second trailing arm portion are each pivotably coupled to the axle member by bushing assemblies.

4. The vehicle suspension assembly of claim 1, wherein the second end of the first torsional member is fixedly secured to the axle member by welding.

5. The vehicle suspension assembly of claim 1, wherein the first trailing arm portion has a C-shaped cross-sectional configuration.

6. The vehicle suspension assembly of claim 1, further comprising:
   a second torsional member having a first end fixedly coupled to the second trailing arm portion and a second end fixedly secured to the axle member at a fourth position, the second torsional member configured to transmit torsion of the axle member to the second trailing arm portion.

7. The vehicle suspension assembly of claim 6, wherein the third and the fourth positions are each located between the first and second positions along a length of the axle member.

8. The vehicle suspension assembly of claim 7, wherein the third and fourth positions are collocated along the length of the axle member.

9. The vehicle suspension assembly of claim 6, wherein the second end of the first torsional member and the second end of the second torsional member are each fixedly secured to the axle member by welding.

10. The vehicle suspension assembly of claim 6, wherein the first and second trailing arm portions and the first and second torsional members cooperate to form a W-shape.

11. The vehicle suspension assembly of claim 6, wherein the first and second trailing arm portions and the first and second torsional members are an integral, one-piece member.

12. The vehicle suspension assembly of claim 11, wherein the integral, one-piece member is homogeneous.

13. The vehicle suspension assembly of claim 1, wherein the axle comprises a composite material.

14. The vehicle suspension assembly of claim 1, wherein the second end of the first torsional member is fixedly secured to the axle member by an adhesive.

15. A vehicle suspension assembly, comprising:
   an axle member;
   a pair of mounting brackets configured to couple to a vehicle frame; and
   a trailing arm arrangement, comprising:
      a first trailing arm portion having a first end pivotably coupled to one of the pair of mounting brackets, and a second end rotationally coupled with the axle member at a first position thereby allowing the axle member to rotate with respect to the first trailing arm portion about a longitudinal axis of the axle member;
      a second trailing arm portion having a first end pivotably coupled to the other of the pair of mounting brackets, and a second end rotationally coupled with the axle member at a second position thereby allowing the axle member to rotate with respect to the second trailing arm portion about the longitudinal axis of the axle member;
      a first torsional member having a first end fixedly coupled to the first trailing arm portion and a second end fixedly secured to the axle member at a third position located between the first and second positions along a length of the axle, the first torsional member configured to transmit torsion of the axle member to the first trailing arm portion; and
      a second torsional member having a first end fixedly coupled to the second trailing arm portion and a second end fixedly secured to the axle member at a fourth position that is located between the first and second positions along the length of the axle member, the second torsional member configured to transmit torsion of the axle member to the second trailing arm portion;
   wherein the first and second trailing arm portions and the first and second torsional members cooperate to form a W-shape.

16. The vehicle suspension assembly of claim 15, wherein the third and fourth positions are collocated along the length of the axle member.

17. The vehicle suspension assembly of claim 15, wherein the second end of the first trailing arm portion and the second end of the second trailing arm portion are each pivotably coupled to the axle member by bushing assemblies.

18. The vehicle suspension assembly of claim 15, wherein the second end of the first torsional member and the second end of the second torsional member are each fixedly secured to the axle member by welding.

19. The vehicle suspension assembly of claim 15, wherein the first trailing arm portion and the second trailing arm portion each have a C-shaped cross-sectional configuration.

20. The vehicle suspension assembly of claim 15, wherein the first and second trailing arm portions and the first and second torsional members are an integral, one-piece member.

21. The vehicle suspension assembly of claim 20, wherein the integral, one-piece member is homogeneous.

22. The vehicle suspension assembly of claim 15, wherein the axle comprises a composite material.

23. The vehicle suspension assembly of claim 15, wherein the second end of the first torsional member and the second end of the second torsional member are each fixedly secured to the axle member by an adhesive.

24. A vehicle suspension assembly, comprising:
a trailing arm arrangement, comprising:
a first trailing arm portion having a first end configured to be pivotably coupled to one of a pair of vehicle frame mounting brackets, and a second end configured to rotationally couple with an axle member at a first position and allow the axle member to rotate with respect to the first trailing arm portion about a longitudinal axis of the axle member;
a second trailing arm portion having a first end configured to be pivotably coupled to the other of the pair of vehicle frame mounting brackets, and a second end configured to rotationally couple with the axle member at a second position and allow the axle member to rotate with respect to the second trailing arm portion about the longitudinal axis of the axle member;
a first torsional member having a first end fixedly coupled to the first trailing arm portion and a second end configured to be fixedly secured to the axle member at a third position located between the first and second positions along a length of the axle, the first torsional member configured to transmit torsion of the axle member to the first trailing arm portion; and
a second torsional member having a first end fixedly coupled to the second trailing arm portion and a second end configured to be fixedly secured to the axle member at a fourth position that is located between the first and second positions along the length of the axle member, the second torsional member configured to transmit torsion of the axle member to the second trailing arm portion;
wherein the first and second trailing arm portions and the first and second torsional members cooperate to form a W-shape.

25. The vehicle suspension assembly of claim 24, wherein the third and fourth positions are configured to be collocated along the length of the axle member.

26. The vehicle suspension assembly of claim 24, wherein the second end of the first trailing arm portion and the second end of the second trailing arm portion are each configured to be pivotably coupled to the axle member by bushing assemblies.

27. The vehicle suspension assembly of claim 24, wherein the second end of the first torsional member and the second end of the second torsional member are each configured to be fixedly secured to the axle member by welding.

28. The vehicle suspension assembly of claim 24, wherein the first trailing arm portion and the second trailing arm portion each have a C-shaped cross-sectional configuration.

29. The vehicle suspension assembly of claim 24, wherein the first and second trailing arm portions and the first and second torsional members are an integral, one-piece member.

30. The vehicle suspension assembly of claim 29, wherein the integral, one-piece member is homogeneous.

\* \* \* \* \*